United States Patent
Yagi et al.

(10) Patent No.: US 10,215,040 B2
(45) Date of Patent: Feb. 26, 2019

(54) COUPLING PART STRUCTURE FOR VANE AND JET ENGINE INCLUDING THE SAME

(71) Applicant: IHI Corporation, Koto-ku (JP)

(72) Inventors: Hiroyuki Yagi, Koto-ku (JP); Rintarou Kajiwara, Koto-ku (JP)

(73) Assignee: IHI Corporation, Koto-ku (JP)

( * ) Notice: Subject to any disclaimer, the term of this patent is extended or adjusted under 35 U.S.C. 154(b) by 410 days.

(21) Appl. No.: 15/194,812

(22) Filed: Jun. 28, 2016

(65) Prior Publication Data

US 2016/0305263 A1 Oct. 20, 2016

Related U.S. Application Data

(63) Continuation of application No. PCT/JP2014/077937, filed on Oct. 21, 2014.

(30) Foreign Application Priority Data

Jan. 16, 2014 (JP) .................................. 2014-005844

(51) Int. Cl.
 *F01D 9/04* (2006.01)
 *F01D 25/16* (2006.01)
 (Continued)

(52) U.S. Cl.
 CPC ............. *F01D 9/041* (2013.01); *F01D 9/042* (2013.01); *F01D 25/005* (2013.01);
 (Continued)

(58) Field of Classification Search
 CPC ........ F01D 9/041; F01D 9/042; F01D 25/005; F04D 29/541; F05D 2240/12
 See application file for complete search history.

(56) References Cited

U.S. PATENT DOCUMENTS

| 3,891,351 A | 6/1975 | Norbut |
| 4,940,386 A | 7/1990 | Feuvrier et al. |

(Continued)

FOREIGN PATENT DOCUMENTS

| DE | 112 724 C | 8/1900 |
| DE | 10 2004 005 237 A1 | 8/2005 |

(Continued)

OTHER PUBLICATIONS

International Search Report dated Jan. 20, 2015 in PCT/JP2014/077937, filed on Oct. 21, 2014 ( with English Translation).

(Continued)

*Primary Examiner* — Ninh H. Nguyen
(74) *Attorney, Agent, or Firm* — Oblon, McClelland, Maier & Neustadt, L.L.P.

(57) ABSTRACT

A coupling support member including a pair of divided pieces is placed in a coupling part between a vane base end portion of a guide vane and an attachment flange, and the pair of divided pieces are joined to the vane base end portion from both the sides in the vane thickness direction. Linear protrusions are respectively formed on both the sides of the vane base end portion. Grooves engaged with the linear protrusions formed in the vane base end portion are respectively formed in the pair of divided pieces of the coupling support member. Side edges that are located on the vane center side of the pair of divided pieces and extend along the chord direction are formed so as to protrude toward the vane center, and the respective tip ends of the side edges are chamfered. The vane base end portion is held between the pair of divided pieces of the coupling support member, by fastening force that is applied to the pair of divided pieces of the coupling support member from both the sides in the vane thickness direction. Such a trouble that a reinforcement (Continued)

fiber layer in an end portion of a vane made of a composite material separates can be minimized.

4 Claims, 5 Drawing Sheets

(51) Int. Cl.
| | | |
|---|---|---|
| | *F04D 29/54* | (2006.01) |
| | *F04D 29/64* | (2006.01) |
| | *F01D 25/00* | (2006.01) |

(52) U.S. Cl.
CPC ......... *F01D 25/162* (2013.01); *F04D 29/542* (2013.01); *F04D 29/644* (2013.01); *F05D 2220/323* (2013.01); *F05D 2220/36* (2013.01); *F05D 2240/12* (2013.01); *F05D 2260/941* (2013.01); *F05D 2300/173* (2013.01); *F05D 2300/174* (2013.01); *F05D 2300/44* (2013.01); *F05D 2300/603* (2013.01); *Y02T 50/672* (2013.01); *Y02T 50/673* (2013.01)

(56) References Cited

U.S. PATENT DOCUMENTS

| | | | | |
|---|---|---|---|---|
| 6,860,716 B2 * | 3/2005 | Czachor | ................ | F01D 25/162 415/142 |
| 8,303,246 B2 * | 11/2012 | Drelon | .................... | F01D 9/042 415/142 |
| 8,646,744 B2 * | 2/2014 | Duchatelle | ................ | F01D 9/04 248/637 |
| 8,734,101 B2 * | 5/2014 | McDonald | .............. | F01D 9/042 415/209.4 |
| 2007/0086854 A1 | 4/2007 | Blanton | | |
| 2011/0299917 A1 | 12/2011 | Samuelsson et al. | | |

FOREIGN PATENT DOCUMENTS

| | | |
|---|---|---|
| EP | 1 548 233 A1 | 6/2005 |
| FR | 1 194 135 A | 11/1959 |
| FR | 2 958 680 A1 | 10/2011 |
| JP | 50-129811 A | 10/1975 |
| JP | 2013-160101 | 8/2013 |
| RU | 40 655 U1 | 9/2004 |
| WO | WO 2010/024736 A1 | 3/2010 |
| WO | WO 2013/115349 A1 | 8/2013 |

OTHER PUBLICATIONS

Extended European Search Report dated Aug. 28, 2017 in Patent Application No. 14879175.9.

* cited by examiner

COUPLING PART STRUCTURE FOR VANE AND JET ENGINE INCLUDING THE SAME

TECHNICAL FIELD

Embodiments described herein relate to a coupling part structure for a vane that constitutes a jet engine and is made of a composite material of thermosetting resin or thermoplastic resin and reinforcement fiber, and a jet engine including the coupling part structure for the vane.

BACKGROUND ART

A structure described in Patent Document 1 is a conventional example of the above-mentioned coupling part structure for the vane made of the composite material.

This coupling part structure for the vane is applied to a coupling part between: a guide vane that is required to have a structural function as well as a flow regulating function of regulating a flow of air introduced by rotor blades; and, for example, a fan frame constituting an engine main body.

That is, in this coupling part structure for the vane, a pair of metal divided pieces is placed so as to be joined to the coupling part between a vane base end portion of the guide vane made of a composite material and the fan frame from both the sides in the vane thickness direction, and a linear protrusion is formed on one side of the vane base end portion whereas a groove engaged with the linear protrusion formed in the vane base end portion is formed in one of the pair of divided pieces, whereby the vane base end portion is sandwiched by applying fastening force to the pair of divided pieces from both the sides in the vane thickness direction.

RELATED ART DOCUMENT

Patent Document

Patent Document 1: Japanese Patent Laid-Open No. 2013-160101

SUMMARY OF THE DISCLOSURE

Problems to be Solved by the Disclosure

However, the above-mentioned conventional coupling part structure for the vane has the following problem. That is, although the conventional coupling part structure for the vane is capable of obtaining a high structural strength while contributing to a reduction in weight of a jet engine, when the guide vane made of the composite material is displaced by a load due to a maneuver of the aircraft, an aerodynamic force applied to the vane surface, or whirling of the main shaft in the case of a failure of the rotor blade, the vane base end portion interferes with side edges closer to the vane center, of the metal divided pieces that sandwich the guide vane, that is, angulated portions of the metal divided pieces. As a result, a compressive stress is concentrated on the vane base end portion, and such a trouble that a reinforcement fiber layer of the composite material separates occurs. This is a conventional problem to be solved.

The present disclosure, which has been made focusing on the above-mentioned conventional problem, has an object to provide a coupling part structure for a vane capable of not only obtaining a high structural strength while contributing to a reduction in weight of a jet engine, but also minimizing such a trouble that a reinforcement fiber layer in an end portion of a vane made of a composite material separates, and a jet engine including the coupling part structure for the vane.

Means for Solving the Problems

In order to achieve the above-mentioned object, according to a first aspect of the present disclosure, provided is a coupling part structure for a vane made of a composite material of thermosetting resin or thermoplastic resin and reinforcement fiber, the coupling part structure including a vane coupling part. The vane coupling part includes a coupling support member placed therein, the coupling support member being made of metal and including a pair of divided pieces separated from each other, the pair of divided pieces being joined to an end portion of the vane from both sides in a vane thickness direction. At least one linear protrusion or groove is formed on at least any one of divided piece sides of the end portion of the vane. A groove or linear protrusion engaged with the linear protrusion or groove formed in the end portion of the vane is formed in at least any one of the pair of divided pieces of the coupling support member. Side edges that are located on a vane center side of the pair of divided pieces of the coupling support member and extend along a chord direction are formed so as to protrude toward the vane center, and respective tip ends of the protruding side edges are chamfered or rounded. The end portion of the vane is held between the pair of divided pieces of the coupling support member, by fastening force that is applied to the pair of divided pieces of the coupling support member from both the sides in the vane thickness direction.

Here, the coupling part structure for the vane according to the present disclosure can be applied to: a coupling part between a vane tip end portion of a guide vane that is a stator vane of a jet engine and an engine main body; and a coupling part between a vane base end portion of, similarly, the guide vane and the engine main body, and can also be applied to: a coupling part between a tip of a rotor blade of the jet engine and a tip shroud; and a coupling part between a hub (base end portion) of, similarly, the rotor blade and a shaft. Note that the tip shroud is provided at the tip of the rotor blade for the purpose of vibration prevention and aerodynamic performance improvement, and rotates together with the rotor blade.

In the coupling part structure for the vane according to the present disclosure, the number of the linear protrusions or grooves formed in the end portion of the vane (the number of the grooves or linear protrusions formed in the coupling support member) is not limited to one, regardless of whether the linear protrusions or grooves are provided on only one of the two sides of the end portion of the vane or provided on both of the two sides thereof. For example, two linear protrusions or grooves may be provided on both of the two sides of the end portion of the vane. Alternatively, one linear protrusion or groove may be provided on one side of the end portion of the vane, and two linear protrusions or grooves may be provided on the other side of the end portion of the vane.

Further, in the coupling part structure for the vane according to the present disclosure, the linear protrusions or grooves formed in the end portion of the vane (the grooves or linear protrusions formed in the coupling support member) can be trapezoidal, semicircular, triangular, and rectangular in cross-section, but are not limited to these shapes.

Moreover, in the coupling part structure for the vane according to the present disclosure, examples of the thermosetting resin usable to form the vane include epoxy resin, phenolic resin, and polyimide resin, and examples of the thermoplastic resin usable to form, similarly, the vane include polyetherimide, polyether ether ketone, and polyphenylene sulfide. Then, examples of the reinforcement fiber usable to form the vane include carbon fiber, aramid fiber, and glass fiber. The vane is formed by, for example, laminating the composite material of these substances in the vane thickness direction or three-dimensionally inweaving the composite material thereof. Meanwhile, metal such as an aluminum alloy and a titanium alloy can be used to form the coupling support member.

In the coupling part structure for the vane according to the present disclosure, first, the end portion of the vane made of the composite material is located between respective opposed walls of the pair of divided pieces of the coupling support member made of the metal. Further, the linear protrusion or groove formed on at least any one side of the end portion of the vane is engaged with the groove or linear protrusion formed in at least any one of the pair of divided pieces of the coupling support member. In this state, for example, the fastening force obtained by the bolts and the nuts is applied to the pair of divided pieces of the coupling support member from both the sides in the vane thickness direction, whereby the end portion of the vane is held between the pair of divided pieces of the coupling support member.

Accordingly, the coupling part structure for the vane according to the present disclosure is capable of obtaining a high structural strength while contributing to a reduction in weight of the jet engine. In addition, because the coupling strength is a mechanical coupling strength, process management for the coupling part is facilitated compared with the coupling strength in the case of using only an adhesive.

Further, because the end portion of the vane is sandwiched between the pair of divided pieces from both the sides in the vane thickness direction, a bending of the end portion of the vane can be avoided compared with, for example, the case where the end portion of the vane is supported by only one of the divided pieces. As a result, a strong coupling state can be maintained.

On this occasion, the side edges that are located on the vane center side of the pair of divided pieces of the coupling support member and extend along the chord direction are formed so as to protrude toward the vane center, and, in addition, the respective tip ends of the protruding side edges are chamfered or rounded. Hence, even if the vane made of the composite material is displaced by a load due to a maneuver of the aircraft, an aerodynamic force applied to the vane surface, or whirling of the main shaft in the case of a failure of the rotor blade, compressive stress concentration when the end portion of the vane interferes with the side edges of the metal divided pieces is alleviated. Accordingly, such a trouble that a reinforcement fiber layer in the end portion of the vane made of the composite material separates can be minimized.

Moreover, at the time of assembling of the end portion of the vane and the coupling support member, the linear protrusion or groove in the end portion of the vane is engaged with the groove or linear protrusion in the coupling support member, whereby the two components are positioned with each other. Accordingly, this assembling work is facilitated.

Effects of the Disclosure

A coupling part structure for a vane according to the present disclosure can produce an extremely excellent effect of not only obtaining a high structural strength while contributing to a reduction in weight of a jet engine, but also minimizing such a trouble that a reinforcement fiber layer in an end portion of a vane made of a composite material separates.

MODE FOR CARRYING OUT THE DISCLOSURE

Hereinafter, the present disclosure is described with reference to the drawings.

Figure 1:
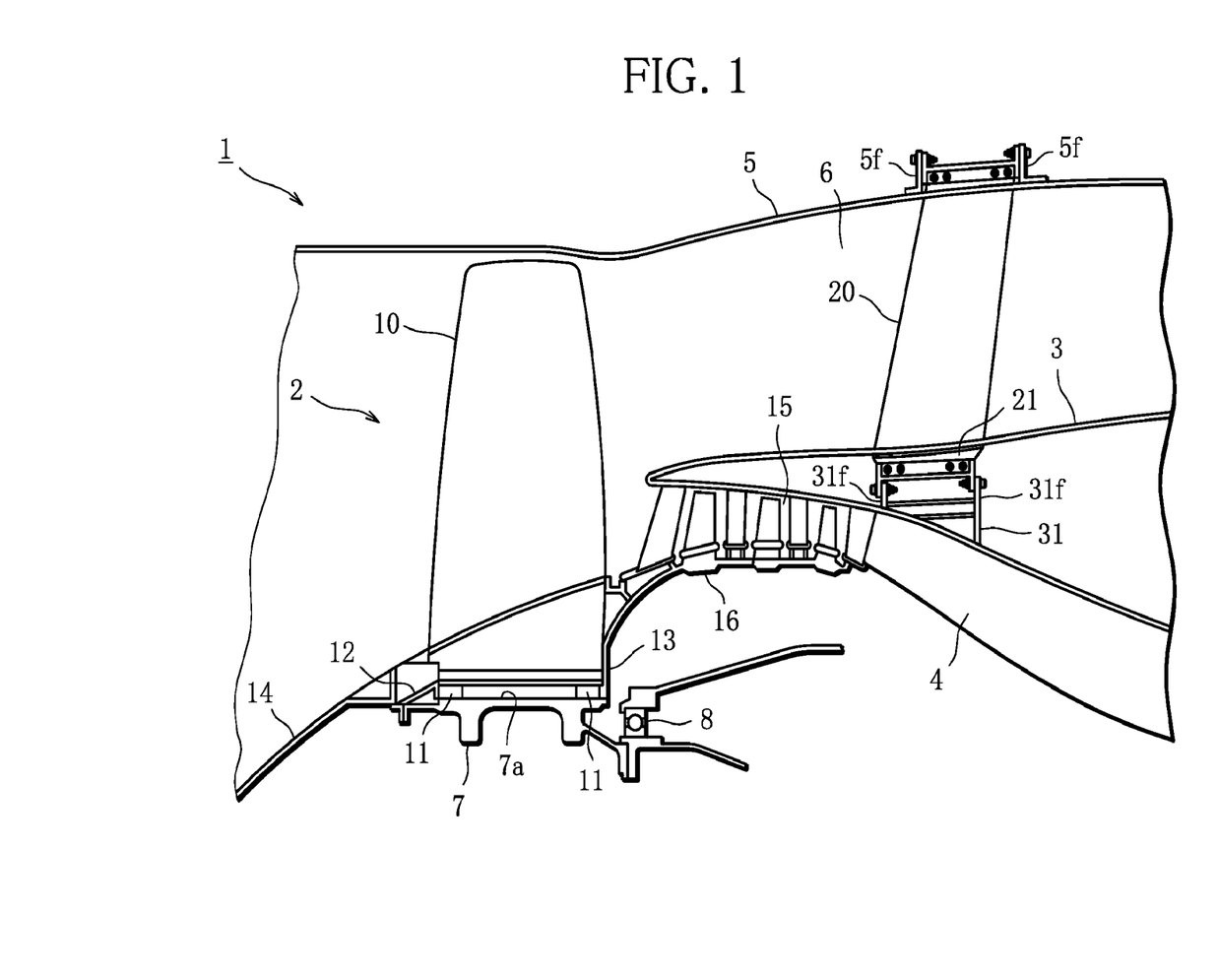
FIG. 1 is an explanatory partial cross-sectional view of a front upper portion of a jet engine to which a coupling part structure for a vane according to one embodiment of the present disclosure is applied.
Figure 2:
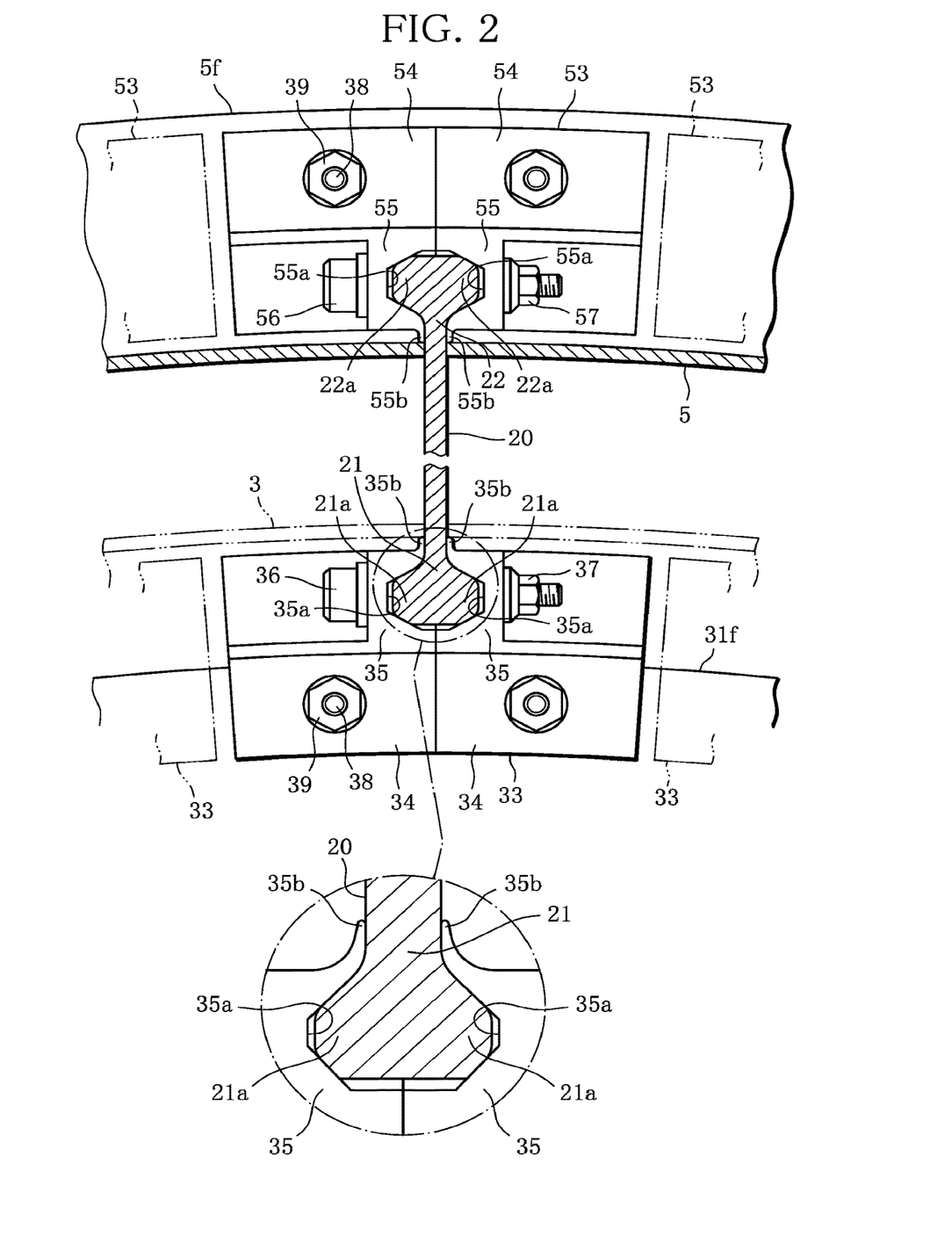
FIG. 2 is an explanatory cross-sectional view of a vane coupling part seen from the front side of the jet engine, illustrating in detail the coupling part structure for the vane in FIG. 1.
Figure 3:
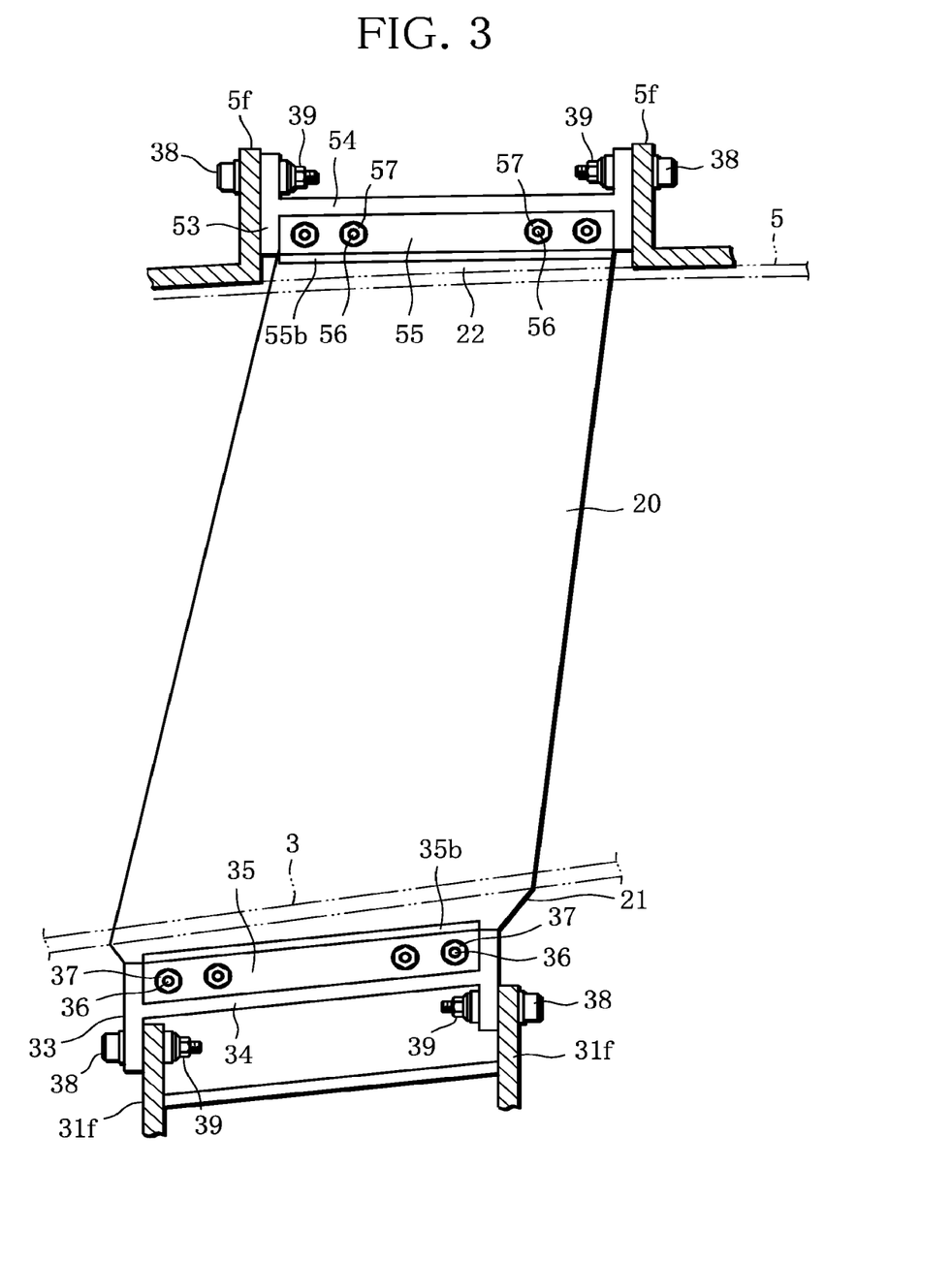
FIG. 3 is an explanatory side view of the vane coupling part, illustrating in detail the coupling part structure for the vane in FIG. 1.

FIG. 1 to FIG. 3 illustrate one embodiment of a coupling part structure for a vane according to the present disclosure, and a coupling part of each guide vane as a stator vane constituting a jet engine is described as an example in this embodiment.

As illustrated in FIG. 1, in a jet engine 1, an annular core flow passage 4 is formed on a shaft center side of an engine inner cylinder 3 of an engine main body 2, and a bypass flow passage 6 is formed between the inner circumferential surface of a fan case 5 corresponding to an outer portion of the engine main body 2 and the outer circumferential surface of the engine inner cylinder 3.

In a front portion (on the left side of FIG. 1) of the jet engine 1, a fan disc 7 is rotatably set around the engine shaft center (not illustrated) via a bearing 8. The fan disc 7 is integrally coupled to a turbine rotor of a low-pressure turbine (not illustrated) placed in a rear portion (on the right side of FIG. 1) of the jet engine 1.

Further, on the outer circumferential surface of the fan disc 7, a plurality of rotor blades 10 are placed equally in the circumferential direction via fitting grooves 7a, and spacers 11, 11 are respectively placed in a front portion and a rear portion between each rotor blade 10 and each fitting groove 7a. Annular retainers 12, 13 that support the rotor blades 10 are respectively integrally set in the circumferential direction in a front portion and a rear portion of the fan disc 7. The retainer 12 in the front portion is integrally coupled to a nose cone 14, and the retainer 13 in the rear portion is coaxially and integrally coupled to a rotor 16 of a low-pressure compressor 15 that is adjacently placed downstream of the fan disc 7.

Note that tip shrouds for vibration prevention and aerodynamic performance improvement are respectively coupled between the tips of the plurality of rotor blades 10, and the tip shrouds are not illustrated in FIG. 1.

That is, when the jet engine 1 is operated, the plurality of rotor blades 10 are rotated together with the fan disc 7, whereby air can be introduced into the core flow passage 4 and the bypass flow passage 6.

The jet engine 1 includes a plurality of guide vanes (stator vanes) 20 in the bypass flow passage 6. The plurality of guide vanes 20 are equally placed around the engine inner cylinder 3, and regulate a swirling flow of air flowing in the bypass flow passage 6. A composite material of: thermosetting resin (such as epoxy resin, phenolic resin, and polyimide resin) or thermoplastic resin (such as polyetherimide, polyether ether ketone, and polyphenylene sulfide); and reinforcement fiber (such as carbon fiber, aramid fiber, and glass fiber) is used as the constituent material of each guide vane 20. The guide vane 20 is formed by, for example, laminating the constituent material in the vane thickness direction or three-dimensionally inweaving the constituent material.

A vane base end portion (vane end portion) 21 on a shaft center side of each guide vane 20 is coupled to an attachment flange 31f of a fan frame 31 placed on the engine inner cylinder 3, and a vane tip end portion (vane end portion) 22 on a side farther from the shaft center of the guide vane 20 is coupled to an attachment flange 5f placed on the fan case 5.

In this case, as illustrated in FIG. 2 and FIG. 3, a coupling support member 33 including a pair of divided pieces 34, 34 separated from each other is placed in a coupling part between the vane base end portion 21 of the guide vane 20 and the attachment flange 31f, namely, a vane coupling part, and the pair of divided pieces 34, 34 are joined to the vane base end portion 21 of the guide vane 20 from both the sides in the vane thickness direction (the left-right direction in FIG. 2). Each of the divided pieces 34, 34 of the coupling support member 33 is made of metal such as an aluminum alloy and a titanium alloy, and is attached to the attachment flange 31f using a bolt 38 and a nut 39.

Opposed walls 35 facing each other are respectively formed on the pair of divided pieces 34, 34 of the coupling support member 33, and the opposed walls 35, 35 are joined to the vane base end portion 21 of the guide vane 20 from both the sides in the vane thickness direction.

In this embodiment, linear protrusions 21a, 21a are respectively formed on both the sides of the vane base end portion 21 of the guide vane 20, whereas grooves 35a engaged with the linear protrusions 21a formed in the vane base end portion 21 of the guide vane 20 are respectively formed on the opposed walls 35, 35 of the pair of divided pieces 34, 34 of the coupling support member 33.

On this occasion, side edges 35b, 35b that are located on the vane center side (the upper side in FIG. 2) of the opposed walls 35, 35 and extend along a chord direction are formed so as to protrude toward the vane center, and the respective tip ends of the protruding side edges 35b, 35b are chamfered. Note that the respective tip ends of the side edges 35b, 35b may be rounded.

Then, in this embodiment, the vane base end portion 21 of the guide vane 20 is held between the respective opposed walls 35, 35 of the pair of divided pieces 34, 34 by the fastening force that is applied by the bolts 36 and the nuts 37 to the pair of divided pieces 34, 34 of the coupling support member 33 from both the sides in the vane thickness direction.

Further, in this embodiment, an adhesive is interposed between the respective opposed walls 35, 35 of the pair of divided pieces 34, 34 of the coupling support member 33 and the vane base end portion 21 of the guide vane 20 held between the opposed walls 35, 35.

Meanwhile, a coupling support member 53 including a pair of divided pieces 54, 54 separated from each other is placed also in a coupling part between the vane tip end portion 22 of the guide vane 20 and the attachment flange 5f, namely, a vane coupling part, and the pair of divided pieces 54, 54 are joined to the vane tip end portion 22 of the guide vane 20 from both the sides in the vane thickness direction (the left-right direction in FIG. 2). Each of the divided pieces 54, 54 of the coupling support member 53 is also made of metal such as an aluminum alloy and a titanium alloy, and is attached to the attachment flange 5f using the bolt 38 and the nut 39.

Opposed walls 55 facing each other are respectively formed also on the pair of divided pieces 54, 54 of the coupling support member 53, and the opposed walls 55, 55 are joined to the vane tip end portion 22 of the guide vane 20 from both the sides in the vane thickness direction.

Also in this vane coupling part, linear protrusions 22a, 22a are respectively formed on both the sides of the vane tip end portion 22 of the guide vane 20, whereas grooves 55a engaged with the linear protrusions 22a formed in the vane tip end portion 22 of the guide vane 20 are respectively formed on the opposed walls 55, 55 of the pair of divided pieces 54, 54 of the coupling support member 53.

Also in this case, side edges 55b, 55b that are located on the vane center side (the lower side in FIG. 2) of the opposed walls 55, 55 and extend along the chord direction are formed so as to protrude toward the vane center, and the respective tip ends of the protruding side edges 55b, 55b are chamfered. Note that the respective tip ends of the side edges 55b, 55b may be rounded.

Then, the vane tip end portion 22 of the guide vane 20 is held between the respective opposed walls 55, 55 of the pair of divided pieces 54, 54 by the fastening force that is applied by the bolts 56 and the nuts 57 to the pair of divided pieces 54, 54 of the coupling support member 53 from both the sides in the vane thickness direction.

Further, also in this vane coupling part, an adhesive is interposed between the respective opposed walls 55, 55 of the pair of divided pieces 54, 54 of the coupling support member 53 and the vane tip end portion 22 of the guide vane 20 held between the opposed walls 55, 55.

As described above, in the coupling part structure for the vane according to this embodiment, first, the vane base end portion 21 (vane tip end portion 22) of each guide vane 20 made of the composite material is located between the opposed walls 35, 35 (55, 55) of the pair of divided pieces 34, 34 (54, 54) of the coupling support member 33 (53) made of the metal. Further, the linear protrusions 21a, 21a (22a, 22a) formed on both the sides of the vane base end portion 21 (vane tip end portion 22) are respectively engaged with the grooves 35a, 35a (55a, 55a) formed on the opposed walls 35, 35 (55, 55) of the pair of divided pieces 34, 34 (54, 54) of the coupling support member 33 (53). In this state, the fastening force obtained by the bolts 36 (56) and the nuts 37 (57) is applied to the pair of divided pieces 34, 34 (54, 54) of the coupling support member 33 (53) from both the sides in the vane thickness direction, whereby the vane base end portion 21 (vane tip end portion 22) is held between the opposed walls 35, 35 (55, 55) of the pair of divided pieces 34, 34 (54, 54).

Accordingly, the coupling part structure for the vane according to this embodiment is capable of obtaining a high structural strength while contributing to a reduction in weight of the jet engine 1. In addition, because the coupling strength is a mechanical coupling strength, process management for the coupling part is facilitated compared with the coupling strength in the case of using only an adhesive.

Further, because the vane base end portion 21 (vane tip end portion 22) is sandwiched between the respective opposed walls 35, 35 (55, 55) of the pair of divided pieces 34, 34 (54, 54) from both the sides in the vane thickness direction, a bending of the vane base end portion 21 (vane tip end portion 22) can be avoided compared with, for example, the case where the vane base end portion 21 (vane tip end portion 22) is supported by a wall on one side. As a result, a strong coupling state can be maintained.

On this occasion, the side edges 35b, 35b (55b, 55b) that are located on the vane center side of the opposed walls 35, 35 (55, 55) of the pair of divided pieces 34, 34 (54, 54) of the coupling support member 33 (53) and extend along the chord direction are formed so as to protrude toward the vane center, and, in addition, the respective tip ends of the protruding side edges 35b, 35b (55b, 55b) are chamfered. Hence, even if the guide vane 20 made of the composite material is displaced by a load due to a maneuver of the aircraft, an aerodynamic force applied to the vane surface, or whirling of the main shaft in the case of a failure of the rotor blade 10, compressive stress concentration when the vane base end portion 21 (vane tip end portion 22) interferes with the side edges 35b, 35b (55b, 55b) of the opposed walls 35, 35 (55, 55) of the metal divided pieces 34, 34 (54, 54) is alleviated. Accordingly, such a trouble that a reinforcement fiber layer in the vane base end portion 21 (vane tip end portion 22) of the guide vane 20 separates can be minimized.

Moreover, at the time of assembling of the vane base end portion 21 (vane tip end portion 22) and the coupling support member 33 (53), the linear protrusion 21b (22b) of the vane base end portion 21 (vane tip end portion 22) is engaged with the groove 35b (55b) of the coupling support member 33 (53), whereby the two components are positioned with each other. Accordingly, this assembling work is facilitated.

Still further, in the coupling part structure for the vane according to this embodiment, the adhesive is interposed between the respective opposed walls 35, 35 (55, 55) of the pair of divided pieces 34, 34 (54, 54) of the coupling support member 33 (53) and the vane base end portion 21 (vane tip end portion 22) of the guide vane 20 held between the opposed walls 35, 35 (55, 55), and hence a higher structural strength can be obtained.

Then, the jet engine according to this embodiment adopts the above-mentioned coupling part structure for the vane, and thus achieves both a reduction in weight and an increase in strength.

Figure 4A:
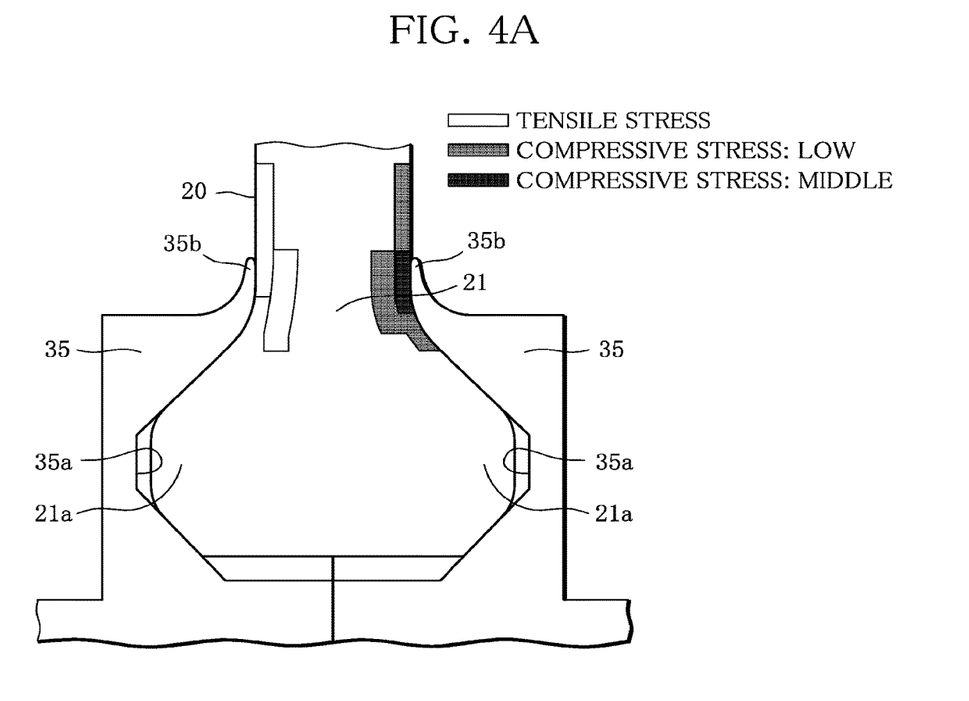
FIG. 4A is an explanatory view of stress distribution in a vane base end portion when a load acts on a guide vane to which the coupling part structure for the vane according to the one embodiment of the present disclosure is applied.
Figure 4B:
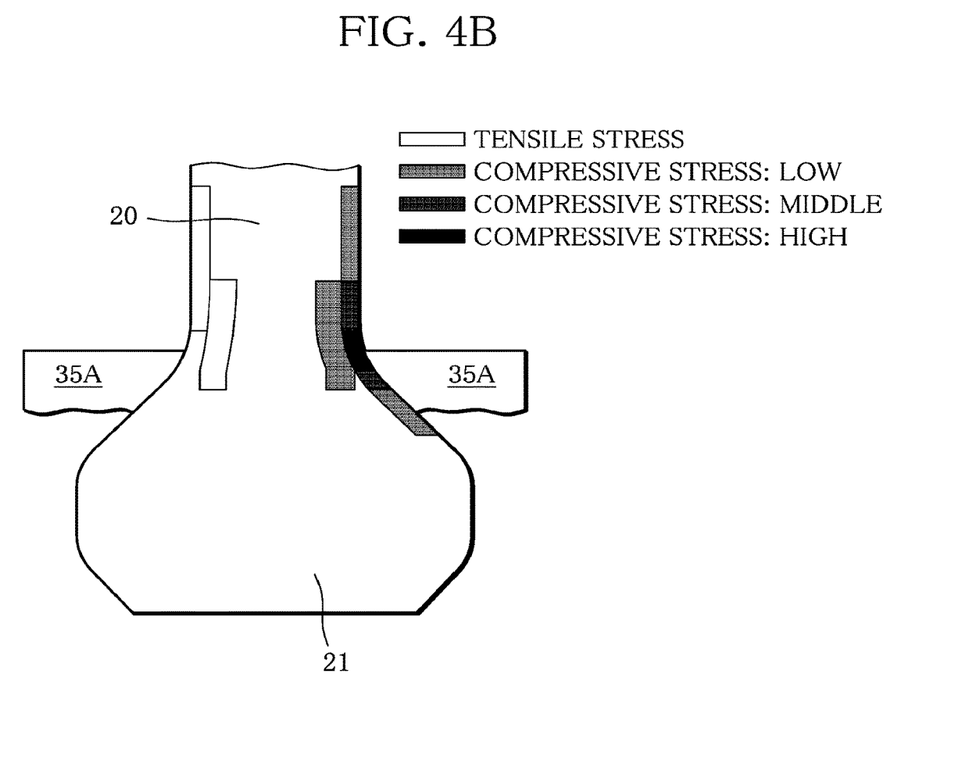
FIG. 4B is an explanatory view of stress distribution in a vane base end portion when a load acts on a guide vane to which a conventional coupling part structure for a vane is applied.

Next, results illustrated in FIG. 4A are obtained by examining stress distribution in the vane base end portion 21 when a load acts on the guide vane 20 to which the coupling part structure for the vane according to this embodiment is applied. For comparison, results illustrated in FIG. 4B are obtained by examining stress distribution in the vane base end portion 21 when a load acts on the guide vane 20 sandwiched between opposed walls 35A, 35A each having an angulated side edge in a conventional coupling support member. Note that both FIG. 4A and FIG. 4B illustrate the case where the load acts from the left to the right in each drawing.

As illustrated in FIG. 4A, a middle-level compressive stress occurs at a maximum in the guide vane 20 to which the coupling part structure for the vane according to this embodiment is applied. In contrast, as illustrated in FIG. 4B, a high compressive stress occurs in the guide vane 20 sandwiched between the opposed walls 35A, 35A each having the angulated side edge.

Accordingly, it is understood that the coupling part structure for the vane according to this embodiment, in which: the side edges 35b, 35b of the opposed walls 35, 35 of the coupling support member 33 are formed so as to protrude toward the vane center; and the respective tip ends of the protruding side edges 35b, 35b are chamfered, can alleviate compressive stress concentration when the vane base end portion 21 interferes with the side edges 35b, 35b of the metal opposed walls 35, 35.

Note that, although a tensile stress occurs on the side opposite to the side on which the compressive stress occurs in the vane base end portion 21 as illustrated in FIG. 4A and FIG. 4B, the tensile stress is a tensile stress in the reinforcement fiber lamination direction (out-of-plane direction), and a reduction in the tensile stress can be expected by supporting a portion in which the tensile stress occurs by the protruding side edges 35b.

In each of the above-mentioned embodiments, the linear protrusions 21a (22a) are formed in the vane base end portion 21 (vane tip end portion 22) of each guide vane 20, and the grooves 35a (55a) are formed in the coupling support member 33 (53), but the present disclosure is not limited to this configuration. Grooves may be formed in the vane base end portion 21 (vane tip end portion 22) of the guide vane 20, and linear protrusions may be formed in the coupling support member 33.

Further, the number of the linear protrusions 21a or grooves in the vane base end portion 21 (vane tip end portion 22) of the guide vane 20 (the number of the grooves 35a (55a) or linear protrusions in the coupling support member 33 (53)) is not limited to one, regardless of whether the linear protrusions or grooves are provided on only the one side or on both of the one side and the other side.

Moreover, the linear protrusion 21a, 22a or the groove 35a, 55a can be trapezoidal, semicircular, triangular, and rectangular in cross-section, but is not limited to these shapes.

According to a first aspect of the present disclosure, provided is a coupling part structure for a vane made of a composite material of thermosetting resin or thermoplastic resin and reinforcement fiber, the coupling part structure including a vane coupling part. The vane coupling part includes a coupling support member placed therein, the coupling support member being made of metal and including a pair of divided pieces separated from each other, the pair of divided pieces being joined to an end portion of the vane from both sides in a vane thickness direction. At least one linear protrusion or groove is formed on at least any one of divided piece sides of the end portion of the vane. A groove or linear protrusion engaged with the linear protrusion or groove formed in the end portion of the vane is formed in at least any one of the pair of divided pieces of the coupling support member. Side edges that are located on a vane center side of the pair of divided pieces of the coupling support member and extend along a chord direction are formed so as to protrude toward the vane center, and respective tip ends of the protruding side edges are chamfered or rounded. The end portion of the vane is held between the pair of divided pieces of the coupling support member, by fastening force that is applied to the pair of divided pieces of the coupling support member from both the sides in the vane thickness direction.

The coupling part structure for the vane according to the first aspect of the present disclosure is capable of obtaining a high structural strength while contributing to a reduction in weight of the jet engine.

In addition, because the coupling strength is a mechanical coupling strength, process management for the coupling part is facilitated compared with the coupling strength in the case of using only an adhesive.

Moreover, because the end portion of the vane is sandwiched between the pair of divided pieces from both the sides in the vane thickness direction, a strong coupling state can be maintained. On this occasion, the side edges that are located on the vane center side of the pair of divided pieces of the coupling support member and extend along the chord direction are formed so as to protrude toward the vane center, and, in addition, the respective tip ends of the protruding side edges are chamfered or rounded. Hence, even if the vane made of the composite material is displaced, compressive stress concentration when the end portion of the vane interferes with the side edges of the metal divided pieces is alleviated. Accordingly, such a trouble that a reinforcement fiber layer in the end portion of the vane made of the composite material separates can be minimized.

Further, at the time of assembling of the end portion of the vane and the coupling support member, the linear protrusion or groove in the end portion of the vane is engaged with the groove or linear protrusion in the coupling support member, whereby the two components are positioned with respect to each other. Accordingly, this assembling work is facilitated.

According to a second aspect of the present disclosure, an adhesive is interposed between the pair of divided pieces of the coupling support member and the end portion of the vane held between the pair of divided pieces.

With this configuration, a higher structural strength can be obtained.

Meanwhile, a jet engine according to the present disclosure includes the above-mentioned coupling part structure for the vane, as a coupling part structure for a vane constituting the jet engine.

With this configuration, both a reduction in weight and an increase in strength can be achieved.

The configurations of the coupling part structure for the vane and the jet engine according to the present disclosure are not limited to the above-mentioned embodiments.

EXPLANATION OF REFERENCE SIGNS

1 jet engine
20 guide vane (stator vane)
21 vane base end portion (vane end portion)
21a, 22a linear protrusion
22 vane tip end portion (vane end portion)
33 coupling support member
34, 54 pair of divided pieces
35a, 55a groove
35b, 55b side edge

The invention claimed is:

1. A coupling part structure for a vane made of a composite material of thermosetting resin or thermoplastic resin and reinforcement fiber, the coupling part structure comprising a vane coupling part, wherein
   the vane coupling part includes a coupling support member placed therein, the coupling support member being made of metal and including a pair of divided pieces separated from each other, the pair of divided pieces being joined to an end portion of the vane from both sides in a vane thickness direction,
   at least one linear protrusion or groove is formed on at least any one of divided piece sides of the end portion of the vane,
   a groove or linear protrusion engaged with the linear protrusion or groove formed in the end portion of the vane is formed in at least any one of the pair of divided pieces of the coupling support member,
   side edges that are located on a vane center side of the pair of divided pieces of the coupling support member and extend along a chord direction are formed so as to protrude toward the vane center,
   respective tip ends of the protruding side edges are chamfered or rounded, and
   the end portion of the vane is held between the pair of divided pieces of the coupling support member, by fastening force that is applied to the pair of divided pieces of the coupling support member from both the sides in the vane thickness direction.

2. The coupling part structure for the vane according to claim 1, wherein an adhesive is interposed between the pair of divided pieces of the coupling support member and the end portion of the vane held between the pair of divided pieces.

3. A jet engine comprising the coupling part structure for the vane according to claim 2, as a coupling part structure for a vane constituting the jet engine.

4. A jet engine comprising the coupling part structure for the vane according to claim 1, as a coupling part structure for a vane constituting the jet engine.

* * * * *